United States Patent
Hu et al.

(10) Patent No.: US 10,577,497 B2
(45) Date of Patent: Mar. 3, 2020

(54) RESIN COMPOSITION AND ARTICLE MADE THEREFROM

(71) Applicant: Elite Electronic Material (Zhongshan) Co., Ltd., Zhongshan, Guang Dong Province (CN)

(72) Inventors: Zhilong Hu, Zhongshan (CN); Hezong Zhang, Zhongshan (CN)

(73) Assignee: ELITE ELECTRONIC MATERIAL (ZHONGSHAN) CO., LTD., Zhongshan, Guang Dong Province (CN)

( * ) Notice: Subject to any disclaimer, the term of this patent is extended or adjusted under 35 U.S.C. 154(b) by 0 days.

(21) Appl. No.: 16/196,472

(22) Filed: Nov. 20, 2018

(65) Prior Publication Data

US 2019/0390055 A1 Dec. 26, 2019

(30) Foreign Application Priority Data

Jun. 26, 2018 (CN) .......................... 2018 1 0672254

(51) Int. Cl.
| | |
|---|---|
| *C08L 63/00* | (2006.01) |
| *C08L 9/02* | (2006.01) |
| *C08L 25/14* | (2006.01) |
| *C08K 5/5399* | (2006.01) |
| *C08K 3/013* | (2018.01) |
| *C08K 5/00* | (2006.01) |
| *C08L 33/08* | (2006.01) |

(52) U.S. Cl.
CPC .............. *C08L 63/00* (2013.01); *C08K 3/013* (2018.01); *C08K 5/0025* (2013.01); *C08K 5/5399* (2013.01); *C08L 9/02* (2013.01); *C08L 25/14* (2013.01); *C08L 33/08* (2013.01); *C08L 2203/20* (2013.01)

(58) Field of Classification Search
USPC .................................................. 524/133, 136
See application file for complete search history.

(56) References Cited

U.S. PATENT DOCUMENTS

| | | | | |
|---|---|---|---|---|
| 2010/0210745 | A1* | 8/2010 | McDaniel | .............. C09D 5/008 521/55 |
| 2015/0351237 | A1* | 12/2015 | Scholz | ................. H05K 1/0373 174/255 |
| 2016/0362527 | A1* | 12/2016 | Koes | .......................... C08J 5/24 |
| 2017/0145266 | A1* | 5/2017 | Scholz | ................. H05K 3/4635 |

* cited by examiner

*Primary Examiner* — Terressa Boykin

(74) *Attorney, Agent, or Firm* — Muncy, Geissler, Olds & Lowe, P.C.

(57) ABSTRACT

A resin composition comprises 100 parts by weight of epoxy resin; 2 to 50 parts by weight of carboxyl-containing butadiene acrylonitrile resin; 1 to 40 parts by weight of phosphazene; and 1 to 8 parts by weight of acrylic triblock copolymer. The resin composition may be made into various articles, such as prepregs, laminates, printed circuit boards or rigid-flex boards, and meets one, more or all of the following properties: high yield rate in solder pad fall-off test at high temperature, low dust weight loss, low stickiness, high thermal resistance, high peel strength to copper foil, and high bonding strength to polyimide layer.

11 Claims, No Drawings

RESIN COMPOSITION AND ARTICLE MADE THEREFROM

CROSS-REFERENCE TO RELATED APPLICATION

This application claims the priority benefits of China Patent Application No. 201810672254.6, filed on Jun. 26, 2018. The entirety the above-mentioned patent application is hereby incorporated by reference herein and made a part of this specification.

BACKGROUND

1. Field of the Disclosure

The present disclosure relates to a resin composition and more particularly to a resin composition useful for preparing a rigid-flex board and other products.

2. Description of Related Art

Conventional printed circuit boards primarily use glass fiber fabrics as the substrate and therefore have rigid structures and are known as "rigid boards," which are not flexible and limit the volume and shape design of end products.

To address this issue, flexible printed circuits (FPC), which are based on flexible material such as a polyimide film (PI film), were proposed, also known as "flexible boards." FPCs are lighter, thinner and flexible, providing advantages such as the capability of changing the shape and allowing three-dimensional wiring. However, FPCs have disadvantages such as higher costs, difficulty in multi-layer PCB fabrication, and low weight load, such that the use of FPCs alone fails to satisfy various needs in the design of electronic products.

Therefore, the combination of flexible boards and rigid boards was proposed, also known as rigid-flex boards, which take advantage of the rigidity of rigid boards and the flexibility of flexible boards to meet various demands in product structure design.

In the designing and manufacturing processes, in order to connect flexible boards and rigid boards and to avoid contaminating circuit patterns already formed on the flexible boards and rigid boards, it is necessary to use prepregs with required properties as the adhesive sheets, such as prepregs with low flow property.

In the fabrication of rigid-flex boards, it is crucial to ensure the reliability of the connection between flexible boards and rigid boards formed by low flow prepregs and ensure no layer separation occurs, which is a difficulty of processing rigid-flex boards; therefore, one major factor affecting the reliability of rigid-flex boards is to properly collocate low flow prepregs with flexible boards.

Because the bonding strength between low flow prepregs and flexible boards is important to the product reliability, the peel strength between the prepreg and the medium contacted therewith after lamination is measured to evaluate the bonding strength.

On the other hand, during high temperature soldering of electronic components to a circuit board, solder pads fall off if the peel strength between the solder pads and the substrate is weak, which will cause defective or malfunctioning products; accordingly, during the evaluation of product reliability, yield rate in a solder pad fall-off test at high temperature is measured to evaluate the peel strength between the solder pads and the substrate.

However, existing resin compositions useful for these prepregs or adhesive sheets, while meeting the requirement of low flow property, fails to perform satisfactorily in other properties, so there is a need to propose a new solution.

SUMMARY

To address the aforesaid and other issues, disclosed herein is a resin composition, which not only performs better and has a higher yield rate in a solder pad fall-off test (e.g., solder pad does not fall off at high temperature), but also achieves in some embodiments low dust weight loss (e.g., low weight loss during cutting) and low stickiness and has at least one of the following properties: high thermal resistance, high peel strength to copper foil, high bonding strength to polyimide (PI) layer, etc.

According to the present disclosure, the resin composition comprises: (A) 100 parts by weight of epoxy resin; (B) 2 to 50 parts by weight of carboxyl-containing butadiene acrylonitrile resin; (C) 1 to 40 parts by weight of phosphazene; and (D) 1 to 8 parts by weight of acrylic triblock copolymer. The resin composition meets different product demands, such as the capability of making a low flow prepreg used in a rigid-flex board.

Relative to 100 parts by weight of epoxy resin, the use amount of the other three main components or other optional additives may be independently adjusted according to the needs. For example, relative to 100 parts by weight of epoxy resin, the content of carboxyl-containing butadiene acrylonitrile resin may be 2 to 40 parts by weight, such as but not limited to 5, 10, 15, 20, 25, 30 or 35 parts by weight; relative to 100 parts by weight of epoxy resin, the content of phosphazene may be 5 to 40 parts by weight, such as but not limited to 10, 15, 20, 25, 30 or 35 parts by weight; relative to 100 parts by weight of epoxy resin, the content of acrylic triblock copolymer may be 1 to 5 parts by weight, such as but not limited to 1, 2, 3, 4 or 5 parts by weight.

In one embodiment, the epoxy resin may comprise greater than or equal to 10 parts by weight, such as but not limited to 10, 50 or 100 parts by weight, of triphenylmethane epoxy resin. For example, the epoxy resin may comprise 10, 50 or 100 parts by weight of an epoxy resin having a structure of Formula (1) as shown below, wherein R represents hydrogen, an alkyl group or an epoxy ether group, and n is an integer of 1 to 10.

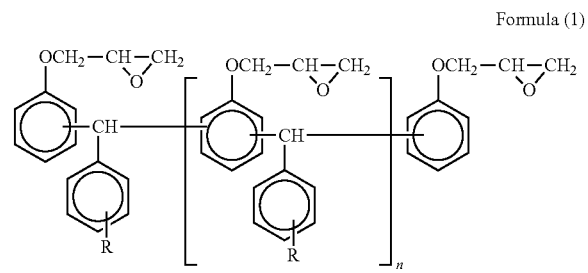

Formula (1)

In one embodiment, the carboxyl-containing butadiene acrylonitrile resin may be in a solid state, a liquid state or a combination of both. In addition, the carboxyl-containing butadiene acrylonitrile resin may comprise carboxyl-terminated butadiene acrylonitrile rubber, prepolymerized carboxyl-terminated butadiene acrylonitrile rubber or a combination thereof.

In another embodiment, the phosphazene comprises a phosphazene compound having a structure of Formula (3) as shown below:

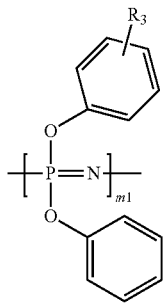

Formula (3)

wherein $R_3$ represents hydrogen, a hydroxyl group, a double bond-containing hydrocarbyl group, a double bond-containing aryl group, an alkoxy group or an alkenyloxy group, and m1 represents a number average degree of polymerization and is a number of 1 to 6.

In another embodiment, the acrylic triblock copolymer comprises unsaturated polyester or polybutadiene as a mid-block and comprises poly(methyl methacrylate) or polystyrene as a terminal block, wherein the unsaturated polyester is an ester polymer having an unsaturated bond, and one example of the unsaturated polyester has a structure of Formula (4) below. Examples of the unsaturated polyester include poly(butyl acrylate), poly(methyl methacrylate), poly(butyl methacrylate), poly(ethyl acrylate), poly(2-ethylhexyl acrylate), poly(2-ethylhexyl methacrylate), poly(isooctyl acrylate) or a combination thereof,

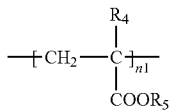

Formula (4)

wherein $R_4$ represents hydrogen or an alkyl group, $R_5$ represents an alkyl group, and n1 represents a degree of polymerization. For example but not limited thereto, $R_4$ may be a methyl group, $R_5$ may be a butyl group and n1 is a positive integer of 1 to 500.

In addition to the four major components described above, the resin composition disclosed herein may further optionally comprise the following curing agent: maleimide resin, benzoxazine resin, polyphenylene oxide resin, cyanate ester resin, isocyanate resin, polyolefin resin, anhydride, polyester, polyvinyl butyral, phenolic curing agent, amine curing agent, polyamide, polyimide or a combination thereof.

In addition to the four major components described above, the resin composition disclosed herein may further optionally comprise the following additives: curing accelerator, flame retardant, inorganic filler, solvent, toughening agent, silane coupling agent or a combination thereof.

The resin composition described above may be used to make various articles, such as but not limited to a prepreg, a laminate, a printed circuit board or a rigid-flex board.

The article made from the resin composition disclosed herein may have at least one, preferably at least two, more or all, of the following properties:

a yield rate of greater than or equal to 80% in a solder pad fall-off test at 350° C.;

a dust weight loss measured from a cutting test of less than or equal to 0.5%;

a peel time measured from a stickiness test of less than or equal to 6 seconds;

a time to delamination as measured by reference to IPC-TM-650 2.4.24.1 of greater than or equal to 50 minutes;

a peel strength at 350° C. as measured by reference to IPC-TM-650 2.4.8 of greater than or equal to 4.6 lb/in;

a bonding strength of a PIA board as measured by reference to IPC-TM-650 2.4.8 of greater than or equal to 4.0 lb/in;

a bonding strength of a PIB board as measured by reference to IPC-TM-650 2.4.8 of greater than or equal to 4.0 lb/in; and a solder dip test of a PIA board or a PIB board as measured by reference to IPC-TM-650 2.4.23 of greater than 20 cycles.

Methods for measuring the aforesaid properties will be elaborated in detail below.

DETAILED DESCRIPTION OF EMBODIMENTS

To enable those skilled in the art to further appreciate the features and effects of the present disclosure, words and terms contained in the specification and appended claims are described and defined. Unless otherwise defined, all technical and scientific terms used herein have the same meaning as commonly understood by those of ordinary skill in the art to which this disclosure pertains. In the case of conflict, the present document and definitions contained herein will control.

As used herein, "a," "an" or any similar expression is employed to describe elements and features of the present disclosure. This is done merely for convenience and to give a general sense of the scope of the present disclosure. Accordingly, this description should be read to include one or at least one and the singular also includes the plural unless it is obvious to mean otherwise.

As used herein, the term "comprises," "comprising," "includes," "including," "has," "having" or any other variant thereof is construed as an open-ended transitional phrase intended to cover a non-exclusive inclusion. For example, a composition or manufacture that comprises a list of elements is not necessarily limited to only those elements but may include other elements not expressly listed or inherent to such composition or manufacture. Further, unless expressly stated to the contrary, the term "or" refers to an inclusive or and not to an exclusive or. For example, a condition "A or B" is satisfied by any one of the following: A is true (or present) and B is false (or not present), A is false (or not present) and B is true (or present), and both A and B are true (or present). In addition, whenever open-ended transitional phrases are used, such as "comprises," "comprising," "includes," "including," "has," "having" or any other variant thereof, it is understood that transitional phrases such as "consisting essentially of" and "consisting of" are also disclosed and included.

In this disclosure, features or conditions presented as a numerical range or a percentage range are merely for convenience and brevity. Therefore, a numerical range or a percentage range should be interpreted as encompassing and specifically disclosing all possible subranges and individual numerals or values therein, particularly all integers therein. For example, a range of "1 to 8" or "between 1 and 8" should be understood as explicitly disclosing all subranges such as 1 to 7, 2 to 8, 2 to 6, 3 to 6, 4 to 8, 3 to 8 and so on, particularly all subranges defined by integers, as well as disclosing all individual values such as 1, 2, 3, 4, 5, 6, 7 and 8. Unless otherwise defined, the aforesaid interpretation rule should be applied throughout the present disclosure regardless broadness of the scope.

Whenever amount or other numeral or parameter is expressed as a range, a preferred range or a series of upper and lower limits, it is understood that all ranges defined by any pair of the upper limit or preferred value and the lower limit or preferred value are specifically disclosed, regardless whether these ranges are explicitly described or not. In addition, unless otherwise defined, whenever a range is mentioned, the range should be interpreted as inclusive of the endpoints and every integers and fractions in the range.

Given the intended purposes and advantages of this disclosure are achieved, numerals or FIGURES have the precision of their significant digits. For example, 40.0 should be understood as covering a range of 39.50 to 40.49.

As used herein, a Markush group or a list of items is used to describe examples or embodiments of the present disclosure. A skilled artisan will appreciate that all subgroups of members or items and individual members or items of the Markush group or list can also be used to describe the present disclosure. For example, when X is described as being "selected from a group consisting of $X_1$, $X_2$ and $X_3$," it is intended to disclose the situations of X is $X_1$ and X is $X_1$ and/or $X_2$. In addition, when a Markush group or a list of items is used to describe examples or embodiments of the present disclosure, a skilled artisan will understand that any subgroup or any combination of the members or items in the Markush group or list may also be used to describe the present disclosure. Therefore, when X is described as being "selected from a group consisting of $X_1$, $X_2$ and $X_3$," and Y is described as being "selected from a group consisting of $Y_1$, $Y_2$ and $Y_3$," the disclosure includes any combination of X is $X_1$ and/or $X_2$ and/or $X_3$ and Y is $Y_1$ and/or $Y_2$ and/or $Y_3$.

The following embodiments and examples are illustrative in nature and are not intended to limit the present disclosure and its application. In addition, the present disclosure is not bound by any theory described in the background and summary above or the following embodiments or examples.

Resin Composition

The present disclosure provides a resin composition comprises: (A) 100 parts by weight of epoxy resin; (B) 2 to 50 parts by weight of carboxyl-containing butadiene acrylonitrile resin; (C) 1 to 40 parts by weight of phosphazene; and (D) 1 to 8 parts by weight of acrylic triblock copolymer. Each component will be described in detail below.

In the resin composition, the epoxy resin is not particularly limited and may be any one or more resins with epoxy functional groups or a modified resin thereof, and may include any one or more epoxy resins suitable for making a prepreg, a laminate, a printed circuit board or a rigid-flex board. Examples of the epoxy resin may include but are not limited to bisphenol A epoxy resin, bisphenol F epoxy resin, bisphenol S epoxy resin, bisphenol AD epoxy resin, phenol novolac epoxy resin, trifunctional epoxy resin, tetrafunctional epoxy resin, multifunctional epoxy resin, dicyclopentadiene (DCPD) epoxy resin, phosphorus-containing epoxy resin, p-xylene epoxy resin, naphthalene epoxy resin (e.g., naphthol epoxy resin), benzopyran epoxy resin, anthracene epoxy resin, norbornene epoxy resin, adamantane epoxy resin, fluorene epoxy resin, biphenyl novolac epoxy resin or isocyanate-modified epoxy resin. The phenol novolac epoxy resin may be bisphenol A novolac epoxy resin, bisphenol F novolac epoxy resin, biphenyl novolac epoxy resin, phenol benzaldehyde epoxy resin, triphenylmethane epoxy resin, phenol aralkyl novolac epoxy resin or o-cresol novolac epoxy resin. The phosphorus-containing epoxy resin may be a DOPO (9,10-dihydro-9-oxa-10-phosphaphenanthrene-10-oxide) epoxy resin or a DPPO (diphenylphosphine oxide) epoxy resin. The DOPO epoxy resin may be a DOPO-containing phenol novolac epoxy resin (DOPO-PN epoxy resin), a DOPO-containing cresol novolac epoxy resin (DOPO-CN epoxy resin), or a DOPO-containing bisphenol novolac epoxy resin (DOPO-BPN epoxy resin), such as a DOPO-bisphenol A novolac epoxy resin or a DOPO-bisphenol F novolac epoxy resin). The DOPO epoxy resin may also be a DOPO-HQ-containing phenol novolac epoxy resin, a DOPO-HQ-containing cresol novolac epoxy resin, or a DOPO-HQ-containing bisphenol novolac epoxy resin. The DOPO epoxy resin may also be a DOPO-NQ-containing phenol novolac epoxy resin.

In one embodiment, 100 parts by weight of the epoxy resin may comprise greater than or equal to 10 parts by weight, such as 10, 50 or 100 parts by weight, of triphenylmethane epoxy resin. For example, the epoxy resin may comprise 10, 50 or 100 parts by weight of an epoxy resin having a structure of Formula (1) as shown below, wherein R represents hydrogen, a $C_1$-$C_8$ alkyl group or a $C_1$-$C_8$ epoxy ether group, and n is an integer of 1 to 10.

Formula (1)

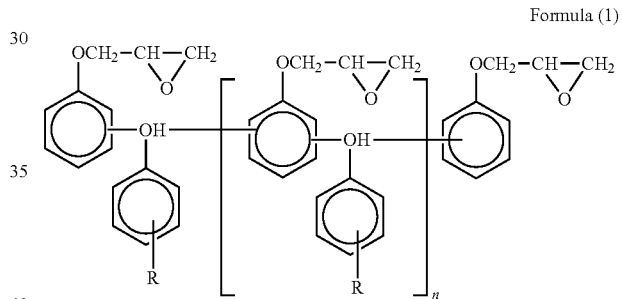

For example, the triphenylmethane epoxy resin may be available from Nan Ya Plastics Corp. under the tradename of NPPN-442 and NPPN-433.

As used herein, the carboxyl-containing butadiene acrylonitrile resin refers to a compound, mixture, oligomer or polymer obtained by reacting butadiene, acrylonitrile and an organic acid, and also comprises a prepolymer formed by the compound, mixture, oligomer or polymer with another component. For example, the carboxyl-containing butadiene acrylonitrile resin comprises carboxyl-terminated butadiene acrylonitrile rubber, prepolymerized carboxyl-terminated butadiene acrylonitrile rubber or a combination thereof. In the resin composition, the carboxyl-containing butadiene acrylonitrile resin is not particularly limited and may be any one or more carboxyl-containing butadiene acrylonitrile resins suitable for making a prepreg, a laminate, a printed circuit board or a rigid-flex board, including but not limited to a carboxyl-containing butadiene acrylonitrile resin in liquid state, solid state or both. The carboxyl-containing butadiene acrylonitrile resin preferably has the following viscosity: for a solid state rubber, it has a Mooney viscosity (ML(1+4)100° C.) ranging from 10 to 60; for a liquid state rubber, it has a viscosity (25° C., Brookfield Method) ranging from 1000 to 600000 cps. If the viscosity is too low, the dust weight loss problem will become serious; if the viscosity is too high, the compatibility will be worsened.

In one embodiment, the carboxyl-containing butadiene acrylonitrile resin is preferably a copolymer or a prepolymer thereof which contains structural units derived from butadiene, acrylonitrile, and organic acid or derivatives thereof and has a terminal carboxyl group; examples of the organic acid include acrylic acid, methacrylic acid, etc. The carboxyl-containing butadiene acrylonitrile resin is preferably a carboxyl-terminated butadiene acrylonitrile copolymer. Examples of the carboxyl-terminated butadiene acrylonitrile copolymer include carboxyl-terminated butadiene acrylonitrile (CTBN) rubber, and preferably the content of the acrylonitrile unit in the butadiene acrylonitrile copolymer is 5% to 50%, more preferably 5% to 40%. Commercially available carboxyl-terminated butadiene acrylonitrile copolymer products useful as the carboxyl-containing butadiene acrylonitrile resin of the present disclosure include but are not limited to: Nipol® 1072CGJ and 1072CGX (available from Zeon Corporation), Hypro™ 1300X8 CTBN, 1300X13 CTBN, 1300X18 CTBNX, and 1300X31 CTBN (available from CVC), etc.

In one embodiment, the carboxyl-containing butadiene acrylonitrile resin is preferably a prepolymerized carboxyl-terminated butadiene acrylonitrile rubber, such as but not limited to a prepolymer of the carboxyl-terminated butadiene acrylonitrile copolymer. For example, according to different needs, the carboxyl-terminated butadiene acrylonitrile rubber may be subject to a prepolymerization reaction with a thermosetting resin to obtain the aforesaid prepolymer. For example, the carboxyl-terminated butadiene acrylonitrile rubber may be polymerized with an epoxy resin to form an epoxy-modified butadiene acrylonitrile rubber. The carboxyl-terminated butadiene acrylonitrile rubber contains an active terminal carboxyl group which may react with an epoxy resin and form a chemical bonding, thereby greatly enhancing the toughness of the epoxy resin, and the toughness decreases slowly when the temperature is increased.

Commercially available products of the prepolymer of carboxyl-terminated butadiene acrylonitrile copolymer include but are not limited to: epoxy-modified carboxyl-terminated butadiene acrylonitrile rubber (AER8095, available from KOLON), a series of products sold by Hexion Inc., bisphenol F epoxy resin-modified carboxyl-terminated butadiene acrylonitrile resin (Epon 58003, elastomer content=40%, EEW=285-330 g/eq), bisphenol F epoxy resin-modified carboxyl-terminated butadiene acrylonitrile resin (Epon 58005, elastomer content=40%, EEW=325-375 g/eq), neopentyl glycol glycidyl ether-modified carboxyl-terminated butadiene acrylonitrile resin (Epon 58034, elastomer content=50%, EEW=275-305 g/eq), HyPoxRK84 (elastomer content=55%, EEW=1200-1800 g/eq), prepolymer of HyPoxRK84L bisphenol A diglycidyl ether and CTBN rubber (elastomer content=55%, EEW=1250-1500 g/eq), etc. Other examples include epoxy-modified CTBN resins (e.g., YR-102, YR-450, etc.) sold by Tohto Kasei Co., Ltd. and CTBN-modified epoxy resins sold by CVC (e.g., HyPox™ RA95, RA840, RA1340, RF928, RM22, RK84L, etc.).

The amount of the carboxyl-containing butadiene acrylonitrile resin is not particularly limited; in view of the bonding strength of the cured product of the resin composition to the polyimide (PI) layer or the yield rate of the solder pad fall-off test at high temperature, relative to 100 parts by weight of the epoxy resin, the amount of the carboxyl-containing butadiene acrylonitrile resin preferably ranges from 2 to 50 parts by weight. If the amount of the carboxyl-containing butadiene acrylonitrile resin is less than 2 parts by weight, sometimes the cured product has poor toughness, the dust weight loss is increased, the yield rate of the solder pad fall-off test at high temperature is decreased, and the stickiness of the product is increased. On the other hand, if the amount of the carboxyl-containing butadiene acrylonitrile resin is greater than 50 parts by weight, although the toughness and the dust weight loss property become better, other properties will be worsened and the fabrication difficulty will be increased.

In the aforesaid resin composition, the phosphazene may be a linear phosphazene polymer or a cyclic phosphazene polymer, and may be any phosphazene suitable for making a prepreg, a laminate, a printed circuit board or a rigid-flex board. For example, the phosphazene is preferably an oligomer or polymer with the following repeating unit with a number average degree of polymerization of 3 or above, including a linear or cyclic structure, more preferably being a cyclic trimer. In addition, the phosphazene may also be a mixture of any ratio of linear phosphazene and cyclic phosphazene.

Formula (2)

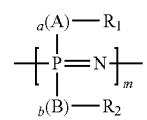

In Formula (2), A and B individually represent O, N or S atom. $R_1$ and $R_2$ individually represent a $C_6$-$C_{15}$ aryl group, a $C_6$-$C_{15}$ alkyl group or a $C_6$-$C_{15}$ cycloalkyl group. $R_1$ and $R_2$ may be bonded to form a ring. a and b are 0 or 1. m represents number average degree of polymerization and ranges from 1 to 6.

In one embodiment, the phosphazene has the following Formula (3):

Formula (3)

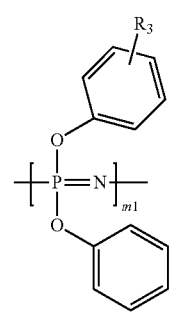

In Formula (3), m1 represents number average degree of polymerization and ranges from 1 to 6. $R_3$ represents hydrogen, a hydroxyl group, a double bond-containing hydrocarbyl group, a double bond-containing aryl group, an alkoxy group or an alkenyloxy group, preferably representing an ether bond-containing and vinyl-substituted $C_1$-$C_{20}$ linear alkyl group, cycloalkyl group, benzyl group or aryl group. Examples of the phosphazene include but are not limited to commercially available SPB-100, SPV-100, SPE-100 or SPH-100 (Otsuka Chemical Co., Ltd.) and FP-390, FP-300 or FP-100 (Fushimi Pharmaceutical Co., Ltd.).

The amount of the phosphazene is not particularly limited; in view of the bonding strength of the cured product of the resin composition to the polyimide layer or the yield rate of the solder pad fall-off test at high temperature, relative to 100 parts by weight of the epoxy resin, the amount of the phosphazene preferably ranges from 1 to 40 parts by weight, more preferably 5 to 40 parts by weight, and further more preferably 5 to 30 parts by weight. If the amount of the phosphazene is less than 1 part by weight, sometimes the cured product has poor toughness, the dust weight loss is increased, the yield rate of the solder pad fall-off test at high temperature is decreased, and the stickiness of the product is increased. On the other hand, if the amount of the phosphazene is greater than 40 parts by weight, although the flame retardancy becomes better, the dust weight loss property and the yield rate of the solder pad fall-off test at high temperature will be worsened.

In the resin composition, the acrylic triblock copolymer refers to a triblock copolymer containing a flexible elastomer (e.g., unsaturated polyester or polybutadiene unit) as a midblock. The acrylic triblock copolymer may be an A-B-A triblock copolymer, an A-B-C triblock copolymer or an A-(B-A)x multi-block copolymer (wherein x may be 2 to 8). In the resin composition, the acrylic triblock copolymer is not particularly limited and may be any one or more acrylic triblock copolymers suitable for making a prepreg, a laminate, a printed circuit board or a rigid-flex board.

In one embodiment, as the flexible block B, the midblock is an unsaturated polyester or polybutadiene, and the unsaturated polyester may have a structure of Formula (4), wherein the ester group is an alkyl group containing 2 to 8 carbon atoms. Examples of the unsaturated polyester include but are not limited to poly(butyl acrylate), poly(methyl methacrylate), poly(butyl methacrylate), poly(ethyl acrylate), poly(2-ethylhexyl acrylate), poly(2-ethylhexyl methacrylate) and poly(isooctyl acrylate), all of which are useful as the midblock. A preferred midblock comprises poly(n-butyl acrylate) or polybutadiene.

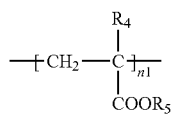

Formula (4)

In Formula (4), $R_4$ represents hydrogen or an alkyl group, $R_5$ represents an alkyl group, and n1 represents a degree of polymerization. In another embodiment, $R_4$ is a methyl group, $R_5$ is a butyl group, and n1 is a positive integer of 1 to 500.

On the other hand, block A and block C (if any) are preferably rigid blocks with higher Tg, such as poly(methyl methacrylate) or polystyrene, and may be functionalized to increase compatibility. For an A-B-A triblock copolymer, in one embodiment, the acrylic triblock copolymer is a triblock copolymer having a poly(butyl acrylate) block between two terminal poly(methyl methacrylate) blocks.

For example, commercially available products useful as the acrylic triblock copolymer include MAM type Nanostrength® block copolymer (having a structure of PMMA-block-PBuA-block-PMMA) sold by Arkema Corporation, such as Nanostrength M22, Nanostrength M51, Nanostrength M52, Nanostrength M53, etc. It should be noted that the aforesaid PMMA-block-PBuA-block-PMMA structure, according to different needs, such as to increase the miscibility, may be functionalized by using monomers having hydrophilic groups such as hydroxyl groups, carboxyl groups, amino groups, etc. Examples include dimethylacrylamide (DMA) functionalized derivatives (PMMA/DMA block PBuA block PMMA/DMA), Nanostrength M52N and Nanostrength M22N.

The A-B-C triblock copolymer may be a polystyrene-block-polybutadiene-block-poly(methyl methacrylate) triblock copolymer. Examples include SBM type Nanostrength® block copolymers sold by Arkema Corporation, such as commercially available products Nanostrength E41, Nanostrength E40, Nanostrength E21, Nanostrength E20, etc.

The acrylic triblock copolymer preferably has a weight-average molecular weight of 10,000 to 100,000, more preferably 10,000 to 50,000. If the weight-average molecular weight is greater than 10,000, desirable toughness and flexibility may be obtained. On the other hand, if the weight-average molecular weight is less than 100,000, deterioration of printability caused by increased viscosity of resin components can be inhibited.

In addition, in the resin composition disclosed herein, the acrylic triblock copolymer is preferably in a liquid state at ambient temperature. When the acrylic triblock copolymer is in a liquid state, it is more dissolvable in the resin composition, making the resin composition more uniform to obtain stable properties.

The amount of the acrylic triblock copolymer is not particularly limited; in view of the bonding strength of the cured product of the resin composition to the polyimide layer or the yield rate of the solder pad fall-off test at high temperature, relative to 100 parts by weight of the epoxy resin, the amount of the acrylic triblock copolymer preferably ranges from 1 to 8 parts by weight, more preferably 1 to 5 parts by weight. Without the presence of the acrylic triblock copolymer, the cured product has poor toughness, the dust weight loss is increased, the thermal resistance, peel strength at ambient temperature and bonding strength to the polyimide layer are all decreased, and particularly the yield rate of the solder pad fall-off test at high temperature is worsened significantly. On the other hand, if the amount of the acrylic triblock copolymer is greater than 8 parts by weight, its compatibility with the epoxy resin in the resin composition will decrease, which may also cause dissolution and significantly deteriorate the properties of the curd product.

In addition, the resin composition disclosed herein may further optionally comprise the following curing agent: maleimide resin, benzoxazine resin, polyphenylene oxide resin, cyanate ester resin, isocyanate resin, polyolefin resin, anhydride, polyester, polyvinyl butyral, phenolic curing agent, amine curing agent, polyamide, polyimide or a combination thereof.

The amount of the maleimide resin is not particularly limited and may range from 1 part by weight to 100 parts by weight relative to 100 parts by weight of the epoxy resin. The maleimide resin refers to a compound, monomer, mixture, oligomer or polymer containing at least one maleimide group. Unless otherwise specified, the maleimide resin used in the present disclosure is not particularly limited and may include any one or more maleimide resins useful for making a prepreg, a laminate, a printed circuit board or a rigid-flex board. Examples include but are not limited to 4,4'-diphenylmethane bismaleimide, oligomer of phenylmethane maleimide (a.k.a. polyphenylmethane maleimide), m-phenylene bismaleimide, bisphenol A diphenyl ether bismaleimide, 3,3'-dimethyl-5,5'-diethyl-4,4'-diphenylmethane bismaleimide, 4-methyl-1,3-phenylene bismaleimide, 1,6-bismaleimide-(2,2,4-trimethyl hexane), N-2,3-xylylmaleimide, N-2,6-xylenemaleimide, N-phenylmaleimide, maleimide compound containing aliphatic long chain structure, prepolymer thereof and a combination thereof. The aforesaid maleimide prepolymer may for example be a prepolymer of diallyl compound and maleimide compound, a prepolymer of diamine compound and maleimide compound, a prepolymer of multi-functional amine compound and maleimide compound or a prepolymer of acid phenol compound and maleimide compound.

For example, the maleimide resin may include products such as BMI-1000, BMI-1000H, BMI-1100, BMI-1100H, BMI-2000, BMI-2300, BMI-3000, BMI-3000H, BMI-4000, BMI-5000, BMI-5100, BMI-TMH, BMI-7000 and BMI-7000H available from Daiwakasei Co., Ltd., or products such as BMI-70 and BMI-80 available from K.I Chemical Industry Co., Ltd.

For example, the maleimide resin containing aliphatic long chain structure may include products such as BMI-689, BMI-1400, BMI-1500, BMI-1700, BMI-2500, BMI-3000, BMI-5000 and BMI-6000 available from Designer Molecules Inc.

The amount of the benzoxazine resin is not particularly limited and may range from 1 part by weight to 100 parts by weight relative to 100 parts by weight of the epoxy resin. The benzoxazine resin used in the present disclosure is not particularly limited and may include any one or more benzoxazine resins useful for making a prepreg, a laminate, a printed circuit board or a rigid-flex board. Examples include but are not limited to bisphenol A benzoxazine resin, bisphenol F benzoxazine resin, phenolphthalein benzoxazine resin, dicyclopentadiene benzoxazine resin, phosphorus-containing benzoxazine resin, dianiline benzoxazine resin and vinyl-modified or allyl-modified benzoxazine resin. Commercially available products include LZ-8270 (phenolphthalein benzoxazine resin), LZ-8280 (bisphenol F benzoxazine resin), and LZ-8290 (bisphenol A benzoxazine resin) available from Huntsman. The dianiline benzoxazine resin may be diaminodiphenylmethane benzoxazine resin, diaminodiphenyl ether benzoxazine resin, diaminodiphenyl sulfone benzoxazine resin, diaminodiphenyl sulfide benzoxazine resin or a combination thereof.

The amount of the polyphenylene oxide resin is not particularly limited and may range from 1 part by weight to 100 parts by weight relative to 100 parts by weight of the epoxy resin. The polyphenylene oxide resin used in the present disclosure is not particularly limited and may include any one or more polyphenylene oxide resins useful for making a prepreg, a laminate, a printed circuit board or a rigid-flex board. Examples include, but not limited to, dihydroxyl-terminated polyphenylene oxide resin (e.g., SA-90 available from SABIC), bis-vinylbenzyl-terminated polyphenylene oxide resin (e.g., OPE-2st available from Mitsubishi Gas Chemical Co., Inc.), vinyl-benzylated modified bisphenol A polyphenylene oxide and methacrylate polyphenylene oxide resin (e.g., SA-9000 available from SABIC).

The amount of the cyanate ester resin is not particularly limited and may range from 1 part by weight to 100 parts by weight relative to 100 parts by weight of the epoxy resin. The cyanate ester resin used herein may include any one or more cyanate ester resins useful for making a prepreg, a laminate, a printed circuit board or a rigid-flex board, such as a compound having an Ar—O—C≡N structure, wherein Ar may be a substituted or unsubstituted aromatic group. Examples include but are not limited to novolac cyanate ester resin, bisphenol A cyanate ester resin, bisphenol F cyanate ester resin, dicyclopentadiene-containing cyanate ester resin, naphthalene-containing cyanate ester resin, phenolphthalein cyanate ester resin, adamantane cyanate ester resin or fluorene cyanate ester resin. The novolac cyanate ester resin may be phenol novolac cyanate ester, bisphenol A novolac cyanate ester resin, bisphenol F novolac cyanate ester resin or a combination thereof. For example, the cyanate ester resin may be available under the tradename Primaset PT-15, PT-30S, PT-60S, CT-90, BADCY, BA-100-10T, BA-200, BA-230S, BA-3000S, BTP-2500, BTP-6020S, DT-4000, DT-7000, Methylcy, and ME-240S sold by Lonza.

The amount of the isocyanate resin is not particularly limited and may range from 1 part by weight to 100 parts by weight relative to 100 parts by weight of the epoxy resin. The isocyanate resin used in the present disclosure is not particularly limited and may include any one or more isocyanate resins useful for making a prepreg, a laminate, a printed circuit board or a rigid-flex board. Examples include but are not limited to 1,4-cyclohexane diisocyanate, isophorone diisocyanate, methylene bis(4-cyclohexylisocyanate), triallyl isocyanurate (TAIC), hydrogenated 1,3-xylylene diisocyanate and hydrogenated 1,4-xylylene diisocyanate.

The amount of the polyolefin resin is not particularly limited and may range from 1 part by weight to 100 parts by weight relative to 100 parts by weight of the epoxy resin. The polyolefin resin used in the present disclosure is not particularly limited and may include any one or more polyolefin resins useful for making a prepreg, a laminate, a printed circuit board or a rigid-flex board. Examples include but are not limited to styrene-butadiene-divinylbenzene terpolymer, styrene-butadiene-maleic anhydride terpolymer, vinyl-polybutadiene-urethane oligomer, styrene butadiene copolymer, hydrogenated styrene butadiene copolymer, styrene isoprene copolymer, hydrogenated styrene isoprene copolymer, methylstyrene copolymer, petroleum resin, cycloolefin copolymer and a combination thereof.

The amount of the anhydride is not particularly limited and may range from 1 part by weight to 100 parts by weight relative to 100 parts by weight of the epoxy resin. The anhydride used in the present disclosure is not particularly limited and may include any one or more anhydrides useful for making a prepreg, a laminate, a printed circuit board or a rigid-flex board. The anhydride may be a mono-functional, bifunctional or multifunctional anhydride.

A mono-functional anhydride contains one cyclic anhydride group (—COOCO—) per molecule. Examples may include but are not limited to dicarboxylic anhydride compound, such as maleic anhydride, phthalic anhydride, 4-methylhexahydrophthalic anhydride, hexahydrophthalic anhydride, methylbicyclo[2,2,1]heptane-2,3-dicarboxylic anhydride, bicyclo[2,2,1]heptane-2,3-dicarboxylic anhydride, and 1,2,3,6-tetrahydrophthalic anhydride. Examples may further include tricarboxylic anhydride compounds, such as trimellitic anhydride. In particular, in order to lower dielectric constant, preferred examples include 4-methylhexahydrophthalic anhydride, hexahydrophthalic anhydride, methylbicyclo[2,2]heptane-2,3-anhydride, bicyclo[2,2,1]heptane-2,3-dicarboxylic anhydride, 1,2,3,6-tetrahydrophthalic anhydride and other alicyclic anhydrides.

Examples of bifunctional anhydride include at least one of pyromellitic dianhydride (PMDA), hydrogenated pyromellitic dianhydride (H-PMDA) and 5-(2,5-dioxotetrahydro-3-furyl)-3-methyl-3-cyclohexene-1,2-dicarboxylic anhydride (MCTC).

Examples of multifunctional anhydride include the binary copolymer styrene maleic anhydride (SMA) resin obtained by reacting styrene monomer with maleic anhydride so as to form the anhydride with multiple anhydride groups. Depending on the different arrangements of styrene monomer and maleic anhydride, SMA can be categorized as alternating copolymer, random copolymer, block copolymer, or graft copolymer, and any one copolymer thereof is useful for the present disclosure. In the styrene maleic anhydride resin, the molar ratio of styrene to maleic anhydride is 1:1, 2:1, 3:1, 4:1, 6:1, 8:1 or 12:1. Examples of styrene maleic anhydride may be but not limited to styrene maleic anhydride copolymers such as SMA-1000, SMA-2000, SMA-3000, EF-30, EF-40, EF-60 and EF-80 sold by Cray Valley. Additionally, the styrene maleic anhydride resin may also be an esterified styrene maleic anhydride copolymer, such as esterified styrene maleic anhydride copolymers SMA1440, SMA17352, SMA2625, SMA3840 and SMA31890 sold by Cray Valley. The styrene maleic anhydride resin can be added individually or as a combination to the resin composition of this disclosure.

The amount of the polyester is not particularly limited and may range from 1 part by weight to 100 parts by weight relative to 100 parts by weight of the epoxy resin. The polyester used in the present disclosure is not particularly limited and may include any one or more polyesters useful for making a prepreg, a laminate, a printed circuit board or a rigid-flex board. Examples include but are not limited to HPC-8000T65 available from DIC Corporation.

The amount of the phenolic curing agent is not particularly limited and may range from 1 part by weight to 100 parts by weight relative to 100 parts by weight of the epoxy resin. The phenolic curing agent used herein may be a mono-functional, bifunctional or multifunctional phenolic curing agent. The phenolic curing agent is not particularly limited, including those currently used in the field of the present disclosure. Examples include but are not limited to dicyclopentadiene phenol resin, biphenyl phenol resin, naphthalene novolac resin, tetrafunctional phenol resin, phenol novolac resin, phenoxy resin or a combination thereof.

Examples of the phenoxy resin include but are not limited to those sold under the tradename PKHA, PKHB, PKHB+, PKHC, PKHH, PKHJ, PKFE, PKHP-200 or PKHW-34 from Gabriel Performance Products and YP50S sold by Nippon Steel & Sumikin Chemical.

The amount of the amine curing agent is not particularly limited and may range from 0.001 part by weight to 10 parts by weight or preferably 1 part by weight to 10 parts by weight relative to 100 parts by weight of the epoxy resin. The amine curing agent used in the present disclosure is not particularly limited and may include any one or more amine curing agents useful for making a prepreg, a laminate, a printed circuit board or a rigid-flex board. Examples include but are not limited to any one or a combination of diamino diphenyl sulfone, diamino diphenyl methane, diamino diphenyl ether, diamino diphenyl sulfide and dicyandiamide (DICY).

Optionally, in addition to the ingredients described above, the resin composition of the present disclosure may further comprise the following additives: curing accelerator, flame retardant, inorganic filler, solvent, toughening agent, silane coupling agent or a combination thereof.

Unless otherwise specified, the curing accelerator used in the present disclosure may increase the resin curing rate and may include any one or more curing accelerators useful for making a prepreg, a laminate, a printed circuit board or a rigid-flex board. The amount of the curing accelerator may range from 0.001 part by weight to 5 parts by weight relative to 100 parts by weight of the epoxy resin. The curing accelerator may comprise a catalyst, such as a Lewis base or a Lewis acid. The Lewis base includes imidazole, boron trifluoride amine complex, ethyltriphenyl phosphonium chloride, 2-methylimidazole, 2-phenylimidazole, 2-ethyl-4-methylimidazole, triphenylphosphine, 4-dimethylaminopyridine or any combination thereof. The Lewis acid may comprise metal salt compounds, such as those of manganese, iron, cobalt, nickel, copper and zinc, such as zinc octanoate, cobalt octanoate, zinc acetylacetonate, and cobalt acetylacetonate as a metal catalyst. Alternatively, the curing accelerator may be a peroxide capable of producing free radicals, including but not limited to dicumyl peroxide, tert-butyl peroxybenzoate, 2,5-dimethyl-2,5-di(tert-butylperoxy)-3-hexyne, di(tert-butylperoxyisopropyl)benzene or any combination thereof.

In addition to the phosphazene, the resin composition may further comprise another flame retardant. The amount of another flame retardant is not particularly limited and may range from 1 part by weight to 100 parts by weight or preferably 1 part by weight to 60 parts by weight or 1 part by weight to 40 parts by weight relative to 100 parts by weight of the epoxy resin. The aforesaid flame retardant may be any one or more flame retardants useful for making a prepreg, a laminate, a printed circuit board or a rigid-flex board; examples of the flame retardant include but are not limited to phosphorus-containing flame retardant, preferably any one or more selected from the following group: ammonium polyphosphate, tri(2-carboxyethyl) phosphine (TCEP), melamine polyphosphate, hydroquinone bis-(diphenyl phosphate), bisphenol A bis-(diphenylphosphate), phosphoric acid tris(chloroisopropyl) ester, trimethyl phosphate (TMP), dimethyl methyl phosphonate (DMMP), condensed phosphate ester (such as resorcinol bis(dixylenyl phosphate), RDXP), such as commercially available products PX-200, PX-201, and PX-202, DOPO and its derivatives or resins, DPPO (diphenylphosphine oxide) and its derivatives or resins, melamine cyanurate, tri-hydroxy ethyl isocyanurate and aluminium phosphinate (such as commercially available products OP-930 and OP-935).

For example, the flame retardant may be a DPPO compound (e.g., di-DPPO compound), a DOPO compound (e.g., di-DOPO compound), a DOPO resin (e.g., DOPO-HQ, DOPO-NQ, DOPO-PN, and DOPO-BPN) and a DOPO-containing epoxy resin, wherein DOPO-PN is a DOPO phenol novolac compound, and DOPO-BPN may be a bisphenol novolac compound, such as DOPO-BPAN (DOPO-bisphenol A novolac), DOPO-BPFN (DOPO-bisphenol F novolac) and DOPO-BPSN (DOPO-bisphenol S novolac).

The amount of the inorganic filler is not particularly limited and may range from 10 parts by weight to 300 parts by weight relative to 100 parts by weight of the epoxy resin. The inorganic filler used in the present disclosure may include any one or more inorganic fillers useful for making a prepreg, a laminate, a printed circuit board or a rigid-flex board. Examples of the inorganic filler comprise silica (fused, non-fused, porous or hollow type, such as commercially available DL0110), aluminum oxide, aluminum hydroxide, magnesium oxide, magnesium hydroxide, calcium carbonate, aluminum nitride, boron nitride, aluminum silicon carbide, silicon carbide, titanium dioxide, zinc oxide, zirconium oxide, mica, boehmite (AlOOH), calcined talc, talc, silicon nitride and calcined kaolin. Moreover, the inorganic filler can be spherical, fibrous, plate-like, particulate, sheet-like or whisker-like in shape and can be optionally pretreated by a silane coupling agent.

As used herein, the purpose of adding solvent is to change the solid content of the resin composition and to adjust the viscosity of the resin composition. The amount of the solvent may range from 30 parts by weight to 300 parts by weight relative to 100 parts by weight of the epoxy resin. Unless otherwise specified, the solvent used in the present disclosure is not particularly limited and may be any one or more solvents suitable for dissolving or diluting the resin composition. For example, the solvent may comprise, but not limited to, methanol, ethanol, ethylene glycol monomethyl ether, acetone, butanone (methyl ethyl ketone), methyl isobutyl ketone, cyclohexanone, toluene, xylene, methoxyethyl acetate, ethoxyethyl acetate, propoxyethyl acetate, ethyl acetate, dimethylformamide, dimethylacetamide, propylene glycol methyl ether, or a mixture thereof.

Unless otherwise specified, the toughening agent used in the present disclosure is not particularly limited and may include any one or more toughening agents useful for making a prepreg, a laminate, a printed circuit board or a rigid-flex board.

Unless otherwise specified, the silane coupling agent used in the present disclosure is not particularly limited and may include any one or more silane coupling agents useful for making a prepreg, a laminate, a printed circuit board or a rigid-flex board. The silane coupling agent may be added directly to the resin composition or coated on the surface of inorganic filler for use. Examples of the silane coupling agent include but are not limited to silane compounds and siloxane compounds, which may be further categorized according to the functional groups into amino silane compounds, amino siloxane compounds, vinyl silane compounds, acrylic silane compounds, epoxy silane compounds, and epoxy siloxane compounds.

In one embodiment, the resin composition disclosed herein comprises 100 parts by weight of epoxy resin, 2 to 50 parts by weight of carboxyl-containing butadiene acrylonitrile resin, 1 to 40 parts by weight of phosphazene and 1 to 8 parts by weight of acrylic triblock copolymer.

In one embodiment, the resin composition disclosed herein comprises 100 parts by weight of epoxy resin, 5 to 50 parts by weight of carboxyl-containing butadiene acrylonitrile resin, 1 to 30 parts by weight of phosphazene and 1 to 8 parts by weight of acrylic triblock copolymer.

In one embodiment, the resin composition disclosed herein comprises 100 parts by weight of epoxy resin, 2 to 40 parts by weight of carboxyl-containing butadiene acrylonitrile resin, 5 to 30 parts by weight of phosphazene and 1 to 5 parts by weight of acrylic triblock copolymer.

In one embodiment, relative to 100 parts by weight of epoxy resin, carboxyl-containing butadiene acrylonitrile resin ranges from 2 to 50 parts by weight, which comprises 2 to 15 parts by weight of carboxyl-terminated butadiene acrylonitrile rubber, 2 to 50 parts by weight of epoxy-modified butadiene acrylonitrile rubber or a combination thereof.

In one embodiment, relative to 100 parts by weight of epoxy resin, carboxyl-containing butadiene acrylonitrile resin ranges from 2 to 50 parts by weight, which comprises 2 to 10 parts by weight of carboxyl-terminated butadiene acrylonitrile rubber, 2 to 40 parts by weight of epoxy-modified butadiene acrylonitrile rubber or a combination thereof Articles Made from Resin Composition The resin composition may be processed by various methods into different articles, such as those suitable for use as components in electronic products, including but not limited to a prepreg, a laminate, a printed circuit board or a rigid-flex board.

For example, resin compositions from various embodiments of the present disclosure may be used to make a prepreg, which has an reinforcement material and a layered structure (insulation layer) formed thereon, wherein the layered structure is made by heating the resin composition to a semi-cured state (B-stage) at a temperature for example between 100° C. and 190° C. The reinforcement material may be woven fabric or non-woven fabric, such as fibrous material, including fiberglass fabrics, which can increase the mechanical strength of the prepreg. Types of fiberglass fabrics are not particularly limited and may be any commercial fiberglass fabric useful for various printed circuit boards, such as E-glass fabric, D-glass fabric, S-glass fabric, T-glass fabric, L-glass fabric or Q-glass fabric, wherein the fiber may comprise yarns and rovings, in spread form or standard form. Non-woven fabric preferably comprises liquid crystal resin non-woven fabric, such as polyester non-woven fabric, polyurethane non-woven fabric and so on, but not limited thereto. Woven fabric may also comprise liquid crystal resin woven fabric, such as polyester woven fabric, polyurethane woven fabric and so on, but not limited thereto. Preferably, the reinforcement material can be optionally pre-treated by silane coupling agent.

In one embodiment, the prepreg is a low flow prepreg having a resin flow of less than or equal to 80 mil.

In a preferred embodiment, the prepreg is a low flow prepreg having a resin flow of less than or equal to 60 mil.

In a preferred embodiment, the prepreg is a low flow prepreg having a resin flow of less than or equal to 20 mil.

In a preferred embodiment, the prepreg is a low flow prepreg having a resin flow of less than or equal to 10 mil.

Resin compositions of various embodiments of the present disclosure may be made into a laminate, such as a copper-clad laminate, which comprises at least two metal foil layers and an insulation layer disposed between the metal foils, wherein the insulation layer is made by curing the resin composition at high temperature and high pressure, a suitable curing temperature being for example between 150° C. and 230° C. and preferably between 190° C. and 210° C. The insulation layer may be the aforesaid prepreg or resin film, and the metal foil may be copper, aluminum, nickel, platinum, silver, gold or alloy thereof, such as a copper foil.

Resin compositions of various embodiments disclosed herein may be used to make rigid-flex boards. For example, the rigid-flex board may be combined with a flexible board, the rigid-flex board may be combined with a rigid board, or two sides of the rigid-flex board may be respectively combined with a flexible board and a rigid board. For example, the low flow prepreg may be cut into a desired shape and size. Then a stack can be prepared according to any one or more of the following four arrangements: a double-sided wiring flexible board disposed below the low flow prepreg, a double-sided wiring flexible board disposed below a thin film (such as a cover layer or an adhesive film) disposed below the low flow prepreg, or a single-sided flexible board disposed below the low flow prepreg (wherein one side of the single-sided flexible board without trace is in contact with the low flow prepreg), or a rigid copper-clad laminate disposed below the low flow prepreg. The stack is then subject to a curing process at high temperature and high pressure under vacuum between 150° C. and 230° C. to obtain the required rigid-flex board.

The laminate may be further processed by trace formation processes to provide a printed circuit board. Conventional processes for making a printed circuit board containing a rigid-flex board can be used to make the printed circuit board.

EXAMPLES

Raw materials below were used to prepare the resin compositions of various Examples and Comparative Examples of the present disclosure according to the amount listed in Table 1 to Table 3 and further fabricated to prepare test samples.

NPPN-442: triphenylmethane epoxy resin, available from Nan Ya Plastics Corp.

NC-3000: biphenyl epoxy resin, available from Nippon Kayaku Co., Ltd.

1072CGJ: solid carboxyl-terminated butadiene acrylonitrile rubber, available from ZEON Corporation.

AER8095: epoxy-modified carboxyl-terminated butadiene acrylonitrile rubber, available from Kolon Industries Inc.

HTB 1200X90: hydroxyl-terminated butadiene acrylonitrile rubber, available from CVC Thermoset Specialties.

ETBN 1300X40: epoxy-terminated butadiene acrylonitrile rubber, available from CVC Thermoset Specialties.

LR-7647: acrylic resin, available from Mitsubishi Chemical Corporation.

M52N: methacrylic triblock copolymer (viscosity: 500 to 600 mPa·s), available from Arkema Corporation.

M22N: methacrylic triblock copolymer (viscosity: 2500 to 3500 mPa·s), available from Arkema Corporation.

D51N: methacrylic diblock copolymer, available from Arkema Corporation.

UN-3320HA: urethane acrylate, available from Negami Chemical.

DICY: dicyandiamide, available from Kingyorker Enterprise Co., Ltd.

ODA: oxydianiline, available from Kingyorker Enterprise Co., Ltd.

SPB-100: phosphazene compound, available from Otsuka Chemical Co., Ltd.

NPEP-208: DOPO-containing triallyl isocyanurate (DOPO-TAIC), available from Nan Ya Plastics Corp.

OP-935: aluminum diethyl phosphinate, available from Clariant Specialty Chemicals.

Di-DOPO: di-DOPO phosphorus-containing high melting point (above 200° C.) flame retardant, as shown below, synthesized by reference to Chinese Patent Application Publication CN105936745A.

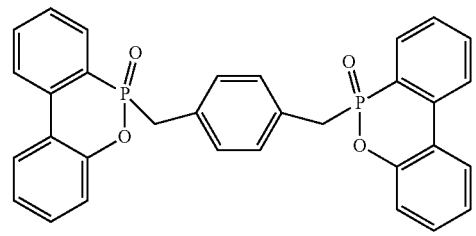 [SMILES: O=P1(Cc2ccc(CP3(=O)Oc4ccccc4-c4ccccc43)cc2)Oc2ccccc2-c2ccccc21]

XZ92741: DOPO-containing bisphenol A novolac resin, available from Dow Chemical Company.

PX-200: resorcinol bis[di(2,6-dimethylphenyl)phosphate], available from Daihachi Chemical Industry Co., Ltd.

D70: silica, available from Jinyi Silicon Materials Development Co., Ltd.

2E4MI: 2-ethyl-4-methylimidazole, available from Shikoku Chemicals Corp.

MEK: methyl ethyl ketone, source not limited.

DMAC: dimethylacetamide, source not limited.

TABLE 1

Resin compositions of Examples (in part by weight)

| | component | | E1 | E2 | E3 | E4 | E5 | E6 | E7 | E8 | E9 | E10 | E11 |
|---|---|---|---|---|---|---|---|---|---|---|---|---|---|
| epoxy resin | triphenylmethane epoxy resin | NPPN-442 | 10 | 50 | 100 | | 50 | 50 | 50 | 50 | 50 | 50 | 50 |
| | biphenyl epoxy resin | NC-3000 | 90 | 50 | | 100 | 50 | 50 | 50 | 50 | 50 | 50 | 50 |
| rubber | solid CTBN | 1072CGJ | 5 | 5 | 5 | 5 | 2 | 10 | 15 | | | | |
| | epoxy-modified CTBN | AER8095 | | | | | | | | 2 | 5 | 20 | 40 |
| | hydroxyl-terminated butadiene acrylonitrile rubber | HTB 1200X90 | | | | | | | | | | | |
| | epoxy-terminated butadiene acrylonitrile rubber | ETBN 1300X40 | | | | | | | | | | | |
| acrylic resin | acrylic resin | LR-7647 | | | | | | | | | | | |
| | methacrylic triblock copolymer | M52N | 2 | 2 | 2 | 2 | 2 | 2 | 2 | 2 | 2 | 2 | 2 |
| | | M22N | | | | | | | | | | | |
| | methacrylic diblock copolymer | D51N | | | | | | | | | | | |
| | urethane acrylate | UN-3320HA | | | | | | | | | | | |
| amine curing agent | dicyandiamide | DICY | 3 | 3 | 3 | 3 | 3 | 3 | 3 | 3 | 3 | 3 | 3 |
| flame retardant | phosphazene | SPB-100 | 15 | 15 | 15 | 15 | 15 | 15 | 15 | 15 | 15 | 15 | 15 |
| | DOPO-TAIC | NPEP-208 | | | | | | | | | | | |

TABLE 1-continued

Resin compositions of Examples (in part by weight)

| | component | | E1 | E2 | E3 | E4 | E5 | E6 | E7 | E8 | E9 | E10 | E11 |
|---|---|---|---|---|---|---|---|---|---|---|---|---|---|
| | phosphinate | OP-935 | | | | | | | | | | | |
| | high melting point flame retardant | Di-DOPO | | | | | | | | | | | |
| | phosphorus-containing phenol novolac resin | XZ92741 | | | | | | | | | | | |
| | phosphate | PX-200 | | | | | | | | | | | |
| inorganic filler | silica | D70 | 40 | 40 | 40 | 40 | 40 | 40 | 40 | 40 | 40 | 40 | 40 |
| catalyst | 2-ethyl-4-methyl imidazole | 2E4MI | 0.05 | 0.05 | 0.05 | 0.05 | 0.05 | 0.05 | 0.05 | 0.05 | 0.05 | 0.05 | 0.05 |
| solvent | methyl ethyl ketone | MEK | 40 | 40 | 40 | 40 | 40 | 40 | 40 | 40 | 40 | 40 | 40 |
| | dimethylacetamide | DMAC | 20 | 20 | 20 | 20 | 20 | 20 | 20 | 20 | 20 | 20 | 20 |

TABLE 2

Resin compositions of Examples (in part by weight)

| | component | | E12 | E13 | E14 | E15 | E16 | E17 | E18 | E19 | E20 | E21 | E22 | E23 | E24 |
|---|---|---|---|---|---|---|---|---|---|---|---|---|---|---|---|
| epoxy resin | triphenylmethane epoxy resin | NPPN-442 | 50 | 50 | 50 | 50 | 50 | 50 | 50 | 50 | 50 | 50 | 50 | 50 | 50 |
| | biphenyl epoxy resin | NC-3000 | 50 | 50 | 50 | 50 | 50 | 50 | 50 | 50 | 50 | 50 | 50 | 50 | 50 |
| rubber | solid CTBN | 1072CGJ | 2 | | 10 | 5 | 5 | 5 | 5 | 5 | 5 | 5 | 5 | 5 | 5 |
| | epoxy-modified CTBN | AER8095 | 25 | 50 | 5 | 15 | 15 | 15 | 15 | 15 | 15 | 15 | 15 | 15 | 15 |
| | hydroxyl-terminated butadiene acrylonitrile rubber | HTB 1200X90 | | | | | | | | | | | | | |
| | epoxy-terminated butadiene acrylonitrile rubber | ETBN 1300X40 | | | | | | | | | | | | | |
| acrylic resin | acrylic resin | LR-7647 | | | | | | | | | | | | | |
| | methacrylic triblock copolymer | M52N M22N | 2 | 2 | 2 | 2 | 2 | 2 | 2 | 1 | 2 | 5 | 8 | 2 | 2 |
| | methacrylic diblock copolymer | D51N | | | | | | | | | | | | | |
| | urethane acrylate | UN-3320HA | | | | | | | | | | | | | |
| amine curing agent | dicyandiamide | DICY | 3 | 3 | 3 | 3 | 3 | 3 | 3 | 3 | 3 | 3 | 3 | 3 | 3 |
| | oxydianiline | ODA | | | | | | | | | | | | | 3 |
| flame retardant | phosphazene | SPB-100 | 15 | 15 | 15 | 1 | 5 | 30 | 40 | 15 | 15 | 15 | 15 | 15 | 15 |
| | DOPO-TAIC | NPEP-208 | | | | | | | | | | | | | |
| | phosphinate | OP-935 | | | | | | | | | | | | | |
| | high melting point flame retardant | Di-DOPO | | | | | | | | | | | | | |
| | phosphorus-containing phenol novolac resin | XZ92741 | | | | | | | | | | | | | |
| | phosphate | PX-200 | | | | | | | | | | | | | |
| inorganic filler | silica | D70 | 40 | 40 | 40 | 40 | 40 | 40 | 40 | 40 | 40 | 40 | 40 | 40 | 40 |
| catalyst | 2-ethyl-4-methyl imidazole | 2E4MI | 0.05 | 0.05 | 0.05 | 0.05 | 0.05 | 0.05 | 0.05 | 0.05 | 0.05 | 0.05 | 0.05 | 0.05 | 0.05 |
| solvent | methyl ethyl ketone | MEK | 40 | 40 | 40 | 40 | 40 | 40 | 40 | 40 | 40 | 40 | 40 | 40 | 40 |
| | dimethylacetamide | DMAC | 20 | 20 | 20 | 20 | 20 | 20 | 20 | 20 | 20 | 20 | 20 | 20 | 20 |

TABLE 3

Resin compositions of Comparative Examples (in part by weight)

| | component | | C1 | C2 | C3 | C4 | C5 | C6 | C7 | C8 |
|---|---|---|---|---|---|---|---|---|---|---|
| epoxy resin | triphenylmethane epoxy resin | NPPN-442 | 50 | 50 | 50 | 50 | 50 | 50 | 50 | 50 |
| | biphenyl epoxy resin | NC-3000 | 50 | 50 | 50 | 50 | 50 | 50 | 50 | 50 |
| rubber | solid CTBN | 1072CGJ | | | | | | | 5 | |
| | epoxy-modified CTBN | AER8095 | | | | | | | | 15 |
| | hydroxyl-terminated butadiene acrylonitrile rubber | HTB 1200X90 | | 20 | | | 5 | | | |
| | epoxy-terminated butadiene acrylonitrile rubber | ETBN 1300X40 | | | 20 | | | 5 | | |
| acrylic resin | acrylic resin | LR-7647 | | | | 20 | | | 5 | |
| | methacrylic triblock copolymer | M52N M22N | 2 | 2 | 2 | 2 | 2 | 2 | 2 | 2 |
| | methacrylic diblock copolymer | D51N | | | | | | | | |
| | urethane acrylate | UN-3320HA | | | | | | | | |
| amine curing agent | dicyandiamide | DICY | 3 | 3 | 3 | 3 | 3 | 3 | 3 | 3 |
| flame retardant | phosphazene | SPB-100 | 15 | 15 | 15 | 15 | 15 | 15 | 15 | |
| | DOPO-TAIC | NPEP-208 | | | | | | | | |
| | phosphinate | OP-935 | | | | | | | | |
| | high melting point flame retardant | Di-DOPO | | | | | | | | |
| | phosphorus-containing phenol novolac resin | XZ92741 | | | | | | | | |
| | phosphate | PX-200 | | | | | | | | |
| inorganic filler | silica | D70 | 40 | 40 | 40 | 40 | 40 | 40 | 40 | 40 |
| catalyst | 2-ethyl-4-methyl imidazole | 2E4MI | 0.05 | 0.05 | 0.05 | 0.05 | 0.05 | 0.05 | 0.05 | 0.05 |
| solvent | methyl ethyl ketone | MEK | 40 | 40 | 40 | 40 | 40 | 40 | 40 | 40 |
| | dimethylacetamide | DMAC | 20 | 20 | 20 | 20 | 20 | 20 | 20 | 20 |

| | component | | C9 | C10 | C11 | C12 | C13 | C14 | C15 | C16 |
|---|---|---|---|---|---|---|---|---|---|---|
| epoxy resin | triphenylmethane epoxy resin | NPPN-442 | 50 | 50 | 50 | 50 | 50 | 50 | 50 | 50 |
| | biphenyl epoxy resin | NC-3000 | 50 | 50 | 50 | 50 | 50 | 50 | 50 | 50 |
| rubber | solid CTBN | 1072CGJ | 5 | 5 | 5 | 5 | 5 | 5 | 5 | 5 |
| | epoxy-modified CTBN | AER8095 | 15 | 15 | 15 | 15 | 15 | 15 | 15 | 15 |
| | hydroxyl-terminated butadiene acrylonitrile rubber | HTB 1200X90 | | | | | | | | |
| | epoxy-terminated butadiene acrylonitrile rubber | ETBN 1300X40 | | | | | | | | |
| acrylic resin | acrylic resin | LR-7647 | | | | | | | | |
| | methacrylic triblock copolymer | M52N M22N | 2 | 2 | 2 | 2 | 2 | | | |
| | methacrylic diblock copolymer | D51N | | | | | | | 2 | |
| | urethane acrylate | UN-3320HA | | | | | | | | 2 |

TABLE 3-continued

| \multicolumn{8}{c}{Resin compositions of Comparative Examples (in part by weight)} | | | | | | | | | | |
|---|---|---|---|---|---|---|---|---|---|---|
| amine curing agent | dicyandiamide | DICY | 3 | 3 | 3 | 3 | 3 | 3 | 3 | 3 |
| flame retardant | phosphazene | SPB-100 | | | | | | 15 | 15 | 15 |
| | DOPO-TAIC | NPEP-208 | 15 | | | | | | | |
| | phosphinate | OP-935 | | 15 | | | | | | |
| | high melting point flame retardant | Di-DOPO | | | 15 | | | | | |
| | phosphorus-containing phenol novolac resin | XZ92741 | | | | 15 | | | | |
| | phosphate | PX-200 | | | | | 15 | | | |
| inorganic filler | silica | D70 | 40 | 40 | 40 | 40 | 40 | 40 | 40 | 40 |
| catalyst | 2-ethyl-4-methyl imidazole | 2E4MI | 0.05 | 0.05 | 0.05 | 0.05 | 0.05 | 0.05 | 0.05 | 0.05 |
| solvent | methyl ethyl ketone | MEK | 40 | 40 | 40 | 40 | 40 | 40 | 40 | 40 |
| | dimethylacetamide | DMAC | 20 | 20 | 20 | 20 | 20 | 20 | 20 | 20 |

Preparation of Varnish

According to the amount listed in Table 1 to Table 3, place the resin composition from each Example (abbreviated as E1, E2, etc.) or Comparative Example (abbreviated as C1, C2, etc.) into a stirrer for stirring and well-mixing to form a resin varnish.

Resin varnishes from Table 1 to Table 3 were used to make samples (specimens) as described below and tested under specified conditions below.

1. Prepreg

Resin composition from each Example or Comparative Example was loaded into an impregnation tank for impregnating fiberglass fabric (e.g., 1078 E-glass fiber fabric, available from Asahi Fiber Glass Co., Ltd.), such that the resin composition was adhered on the fiberglass fabric, followed by heating at 190° C. for about 3 minutes to obtain a prepreg with a resin content of about 62%.

2. Copper-Containing Laminate (i.e., Copper-Clad Laminate, Obtained by Laminating Five Prepregs)

Two pieces of 0.5 ounce (oz) (thickness of 18 μm) HTE (High Temperature Elongation) copper foil and five pieces of prepreg obtained from each sample were prepared. A copper foil, five prepregs and a copper foil were superimposed in such order and then subject to a vacuum condition for lamination at 180° C. for 1 hour to form each copper-containing laminate sample. In the sample, five superimposed prepregs were cured to form the insulation material layer between the two copper foils, wherein the insulation material layer has a resin content of about 62%.

3. Copper-Free Laminate (Obtained by Laminating Five Prepregs)

Each copper-containing laminate obtained above was etched to remove the two copper foils so as to obtain the copper-free laminate. Each copper-free laminate was formed by laminating five prepregs, and the resin content thereof was about 62%.

4. Rigid-Flex Board (PIA Board, Formed by Laminating a Core, Prepregs and a Polyimide Film)

A core was prepared as follows: preparing four prepregs (e.g., EM-827 available from Elite Material Co., Ltd., using 7628 E-glass fabric, RC=42%); a copper foil was covered on each of the two sides of the four superimposed prepregs, followed by lamination and curing for 1 hour in vacuum at high temperature (180° C.) and high pressure (360 psi) to obtain a copper-containing core. Then the core was subject to a brown oxidation process to obtain a brown oxide treated core. Next, on the brown oxide treated core, prepreg/polyimide film (PI film, available from TAIFLEX Scientific Co., Ltd. under the tradename FHK0525, with its adhesive film in contact with the copper foil)/0.5 ounce HTE (High Temperature Elongation) copper foil were sequentially placed in the aforesaid order, followed by curing at high temperature and high pressure to obtain a rigid-flex board (PIA board), wherein the suitable curing temperature ranges from 150° C. to 230° C., preferably from 190° C. to 210° C.

5. Rigid-Flex Board (PIB Board, Formed by Laminating a Core, a Polyimide Film and Prepregs)

On the brown oxide treated core, polyimide film (PI film, available from TAIFLEX Scientific Co., Ltd. under the tradename FHK0525, with its adhesive film in contact with the core)/prepreg/0.5 ounce HTE (High Temperature Elongation) copper foil were sequentially placed in the aforesaid order, followed by curing at high temperature and high pressure to obtain a rigid-flex board (PIB board), wherein the suitable curing temperature ranges from 150° C. to 230° C., preferably from 190° C. to 210° C.

6. Sample for Solder Pad Fall-Off Test at High Temperature

Prepregs made from the resin varnish from each Example or Comparative Example were prepared. Copper foil (⅓ oz, 12 μm)/prepreg/core/prepreg/copper foil (⅓ oz, 12 μm) were superimposed in such order and then subject to a vacuum condition for lamination at 180° C. for 1 hour to form a copper-containing laminate. Next, a 16 inch×18 inch copper-clad laminate was subject to acid pickling, water washing, film adhesion and exposure etching processes to form a predetermined pattern, followed by demolding and electroplating to a copper thickness of the pattern of 25 to 30 μm.

Each specimen was analyzed as described below.

1. Glass Transition Temperature (Tg)

The copper-free laminate (obtained by laminating five prepregs) specimen was subject to glass transition temperature measurement. Differential scanning calorimetry (DSC) was employed by reference to IPC-TM-650 2.4.25C "Glass Transition Temperature and Cure Factor by DSC" to measure the glass transition temperature of each specimen.

2. Thermal Resistance (T288)

The copper-containing laminate (obtained by laminating five prepregs) specimen was used in the T288 thermal resistance test. At a constant temperature of 288° C., a thermomechanical analyzer (TMA) was used by reference to IPC-TM-650 2.4.24.1 "Time to Delamination (TMA Method)" to measure each specimen and record the time to delamination.

3. Copper Foil Peel Strength (P/S) at Ambient Temperature

The copper-containing laminate (obtained by laminating five prepregs) was cut into a rectangular specimen with a width of 24 mm and a length of greater than 60 mm, which was etched to remove surface copper foil and leave a rectangular copper foil with a width of 3.18 mm and a length of greater than 60 mm. The specimen was tested by using a tensile strength tester by reference to IPC-TM-650 2.4.8 at ambient temperature (about 25° C.) to measure the force (lb/in) required to pull off the copper foil from the laminate surface.

4. Copper Foil Peel Strength at High Temperature (High Temperature P/S)

The copper-containing laminate (obtained by laminating five prepregs) was cut into a rectangular specimen with a width of 24 mm and a length of greater than 60 mm, which was etched to remove surface copper foil and leave a rectangular copper foil with a width of 3.18 mm and a length of greater than 60 mm. Before the test, a closed high temperature furnace was used to heat the pulling kit of the tensile strength tester and the laminate to 350° C., such that the laminate temperature and the surrounding temperature were both 350° C. Then the specimen was tested by using the tensile strength tester by reference to IPC-TM-650 2.4.8 to measure the force (lb/in) required to pull off the copper foil from the laminate surface.

5. Solder Pad Fall-Off Test at High Temperature

In the solder pad fall-off test at high temperature, each specimen has 10×27 blocks, and each block contains 5×5 rectangular patterns. Five blocks (125 patterns in total) were randomly chosen, coated with soldering flux and then coated with tin. A soldering gun (at 350° C.) was set perpendicular to the laminate surface and touched with each pattern for 5 seconds. The number of fallen patterns was counted to calculate the yield rate of the solder pad fall-off test at high temperature (yield rate=(number of patterns not falling/125)×100%).

6. PIA Bonding Strength

The PIA rigid-flex board was cut into a rectangular specimen with a width of 24 mm and a length of greater than 60 mm, which was cut to remove surface copper foil and leave a rectangular copper foil with a width of 3.18 mm and a length of greater than 60 mm. The specimen was tested by using a tensile strength tester by reference to IPC-TM-650 2.4.8 at ambient temperature (about 25° C.) to measure the force (lb/in) required to pull off the copper foil and the polyimide layer together from the insulation layer formed by the prepreg (including the core part).

7. PIB Bonding Strength

The PIB rigid-flex board was cut into a rectangular specimen with a width of 24 mm and a length of greater than 60 mm, which was cut to remove surface copper foil and leave a rectangular copper foil with a width of 3.18 mm and a length of greater than 60 mm. The specimen was tested by using a tensile strength tester by reference to IPC-TM-650 2.4.8 at ambient temperature (about 25° C.) to measure the force (lb/in) required to pull off the copper foil and the insulation layer formed by the prepreg together from the polyimide layer (including the core part).

8. PIA/PIB Soldering Resistance

In the soldering resistance test, the aforesaid rigid-flex boards PIA and PIB were used as the specimens and tested by reference to IPC-TM-650 2.4.23 "Soldering Resistance of Laminate Materials". Each specimen was soaked in a 288° C. solder bath for 10 seconds as one cycle, removed and placed under room temperature for about 10 seconds, and then soaked in the solder bath for 10 seconds, and removed and placed under room temperature for about 10 seconds. The processes were repeated to measure the total cycles before the specimen occurs delamination. In general, greater number of total cycles before delamination in the soldering resistance test indicates that the article made from the resin composition (e.g., copper-clad laminate) has better thermal resistance.

9. Dust Weight Loss of Prepreg

The prepreg was cut to a size of 10 cm×10 cm, and the measured weight was denoted as W0. A cutter was arranged perpendicular to one edge of the prepreg to cut the prepreg, 9 cm length per cut for 30 times, and then the prepreg was shaken up and down by hand at a frequency of 2 times/second by an amplitude of about 10 cm for 50 times and then weighed again to measure the weight, which is denoted as W1. The dust weight loss was calculated according to the equation below, and the average of 4 measurements was recorded.

$$\text{Dust weight loss (\%)}=((W0-W1)/W0)\times 100\%$$

10. Prepreg Stickiness (Degree of Resin Loss from Prepreg Surface)

The prepreg was cut to a sheet size of 21 cm×30 cm. Ten sheets were aligned and stacked and placed into an aluminum foil package and were subject to vacuum packaging. After that, the package was placed to a constant temperature cabinet at 30° C. for 72 hours, and the 10 sheets of prepreg were removed from the packaged and peeled one by one. During the peeling process, the 10 sheets of prepreg were first erected as a whole, and then the outmost prepreg was attached with a 10 gram weight at any upper corner such that the outmost prepreg was peeled off from the other 9 prepregs due to the existence of gravity. The duration from the weight has been attached to the outmost prepreg has been completely peeled off was recorded. A set of 9 measurements were recorded, and the average thereof was calculated. In addition, visual observation of the degree of resin loss from prepreg surface was also performed to evaluate the prepreg stickiness.

Property Measurement

The resin compositions and various articles made therefrom according to the present disclosure, such as a prepreg, a laminate, a printed circuit board or a rigid-flex board, may achieve one, more or all of the following desirable properties:

Low dust weight loss: the dust weight loss of a general prepreg is less than or equal to 0.5% (preferably less than or equal to 0.3%), preferably less than or equal to 0.03%, 0.05%, 0.08%, 0.10%, 0.12%, 0.15% or 0.17%, such as between 0.02% and 0.5% (preferably between 0.02% and 0.3%). Generally speaking, high dust weight loss indicates serious dust loss problem (e.g., greater than 0.5%), which will result in contamination of circuit pattern on the PCB surface and affect the quality and yield rate of the products after lamination. It has been known that conventional low flow prepregs usually have the problem of high dust weight loss; after the drilling process of the circuit board, if these products are used in subsequent processes and lamination, dust loss problem will cause contamination of circuit pattern and abnormal connection of the circuit, such as short circuit, or unevenness during layer build-up process of the circuit board, resulting in the increase of defect rate of the products.

High thermal resistance of the laminate: a time to delamination as measured in the T288 thermal resistance test for specimens is greater than or equal to 40 minutes, preferably greater than or equal to 50 minutes, more preferably greater than or equal to 60 minutes, such as between 40 and 120 minutes.

High peel strength at high temperature: the peel strength of the specimens measured at 350° C. is greater than or equal to 4.6 lb/in, preferably greater than or equal to 4.7 lb/in, 4.8 lb/in, 4.9 lb/in, 5.0 lb/in, 5.1 lb/in or 5.2 lb/in, such as between 4.6 lb/in and 5.5 lb/in.

High bonding strength to polyimide layer: the PIA board bonding strength is greater than or equal to 4.0 lb/in, preferably greater than or equal to 5.0 lb/in, 5.7 lb/in, 5.8 lb/in, 6.0 lb/in, 6.2 lb/in or 6.6 lb/in, such as between 4.0 lb/in and 6.8 lb/in. The PIB board bonding strength is greater than 4.0 lb/in, preferably greater than 5.0 lb/in, 5.8 lb/in, 6.0 lb/in, 6.5 lb/in, 7.0 lb/in, 8.0 lb/in or not peelable (>8.0 lb/in), such as between 4.0 lb/in and 9.0 lb/in.

High PIA/PIB soldering resistance: the solder dip number of specimens is greater than 10, 15, 20, 25 or 30 cycles without causing delamination.

High yield rate in solder pad fall-off test at high temperature: the yield rate in the solder pad fall-off test at high temperature is greater than or equal to 80%, preferably greater than or equal to 90%, more preferably being 100%, such as between 80% and 100%.

Low prepreg stickiness: the peel-off time of the surface prepreg is less than or equal to 6 seconds (preferably less than or equal to 3 seconds), such as less than or equal to 5 seconds, 4 seconds, 3 seconds, 2 seconds or 1 second. In addition, visual observation indicates no resin loss or low degree of resin loss from prepreg surface.

TABLE 4

Test results of resin compositions of Examples

| Property | Test item (method) | unit | E1 | E2 | E3 | E4 | E5 | E6 | E7 | E8 | E9 | E10 | E11 |
|---|---|---|---|---|---|---|---|---|---|---|---|---|---|
| Glass transition temperature | Tg (DSC) | ° C. | 150 | 160 | 172 | 145 | 163 | 156 | 150 | 162 | 162 | 158 | 152 |
| Thermal resistance (T288) | TMA/288° C. | minute | 50 | >60 | >60 | 45 | >60 | >60 | 50 | >60 | >60 | >60 | >60 |
| Ambient temperature P/S (25° C.) | tensile strength tester | lb/in | 8.0 | 7.6 | 7.2 | 8.0 | 7.6 | 7.2 | 7.0 | 7.2 | 7.5 | 7.3 | 7.2 |
| High temperature P/S (350° C.) | tensile strength tester | lb/in | 5.2 | 5.0 | 4.7 | 5.2 | 5.0 | 4.6 | 4.5 | 4.7 | 4.9 | 4.8 | 4.8 |
| Yield rate in solder pad fall-off test | / | % | 95 | 100 | 100 | 80 | 100 | 95 | 90 | 80 | 100 | 100 | 95 |
| PIA bonding strength | tensile strength tester | lb/in | 6.2 | 6.0 | 5.6 | 6.0 | 6.0 | 5.8 | 5.0 | 6.0 | 5.9 | 5.8 | 5.6 |
| PIB bonding strength | tensile strength tester | lb/in | 6.0 | 6.5 | 7.2 | 4.3 | >8.0 | 5.8 | 4.0 | 4.0 | >8.0 | >8.0 | >8.0 |
| PIA/PIB soldering resistance | 288° C., 10 seconds | cycles | >20 | >20 | >20 | 10 | >20 | >20 | 15 | >20 | >20 | >20 | >20 |
| Dust weight loss | / | % | 0.12 | 0.10 | 0.10 | 0.15 | 0.30 | 0.08 | 0.05 | 0.50 | 0.17 | 0.12 | 0.10 |
| Prepreg stickiness | peel-off time (30° C./ 72 h/10 g) | second | 2 | 2 | 2 | 2 | 1 | 2 | 2.5 | 1 | 1 | 2 | 2 |
| | Degree of resin loss from prepreg surface (visual observation) | / | none | none | none | none | none | none | none | none | none | none | none |

TABLE 5

Test results of resin compositions of Examples

| Property | Test item (method) | unit | E12 | E13 | E14 | E15 | E16 | E17 |
|---|---|---|---|---|---|---|---|---|
| Glass transition temperature | Tg (DSC) | ° C. | 154 | 145 | 157 | 158 | 157 | 153 |
| Thermal resistance (T288) | TMA/288° C. | minute | >60 | 40 | >60 | 50 | >60 | >60 |
| Ambient temperature P/S (25° C.) | tensile strength tester | lb/in | 7.2 | 7.0 | 7.2 | 8.0 | 7.6 | 7.0 |
| High temperature P/S (350° C.) | tensile strength tester | lb/in | 4.7 | 4.6 | 4.7 | 5.2 | 4.9 | 4.7 |

TABLE 5-continued

Test results of resin compositions of Examples

| | | | | | | | | |
|---|---|---|---|---|---|---|---|---|
| Yield rate in solder pad fall-off test | / | % | 95 | 90 | 100 | 92 | 98 | 100 |
| PIA bonding strength | tensile strength tester | lb/in | 5.6 | 5.0 | 5.7 | 6.6 | 6.2 | 5.5 |
| PIB bonding strength | tensile strength tester | lb/in | >8.0 | >8.0 | 6.0 | >8.0 | >8.0 | 6.0 |
| PIA/PIB soldering resistance | 288° C., 10 seconds | cycles | >20 | 12 | >20 | >20 | >20 | >20 |
| Dust weight loss | / | % | 0.10 | 0.08 | 0.05 | 0.30 | 0.10 | 0.03 |
| Prepreg stickiness | peel-off time (30° C./ 72 h/10 g) | second | 2.5 | 6.0 | 2.5 | 5.0 | 3.0 | 2.0 |
| | Degree of resin loss from prepreg surface (visual observation) | / | none | mild | none | mild | none | none |

| Property | Test item (method) | E18 | E19 | E20 | E21 | E22 | E23 | E24 |
|---|---|---|---|---|---|---|---|---|
| Glass transition temperature | Tg (DSC) | 150 | 157 | 156 | 154 | 150 | 155 | 158 |
| Thermal resistance (T288) | TMA/288° C. | 50 | >60 | >60 | >60 | 50 | >60 | >60 |
| Ambient temperature P/S (25° C.) | tensile strength tester | 6.0 | 7.2 | 7.5 | 7.5 | 7.5 | 7.6 | 7.6 |
| High temperature P/S (350° C.) | tensile strength tester | 3.8 | 4.7 | 4.9 | 4.9 | 4.9 | 4.8 | 4.9 |
| Yield rate in solder pad fall-off test | / | 95 | 100 | 100 | 98 | 80 | 99 | 100 |
| PIA bonding strength | tensile strength tester | 4.0 | 5.8 | 6.0 | 6.2 | 6.0 | 6.0 | 6.0 |
| PIB bonding strength | tensile strength tester | 5.0 | >8.0 | >8.0 | >8.0 | >8.0 | >8.0 | >8.0 |
| PIA/PIB soldering resistance | 288° C., 10 seconds | >20 | >20 | >20 | >20 | 18 | >20 | >20 |
| Dust weight loss | / | 0.08 | 0.06 | 0.05 | 0.05 | 0.08 | 0.05 | 0.05 |
| Prepreg stickiness | peel-off time (30° C./ 72 h/10 g) | 2.0 | 2.5 | 2.5 | 2.0 | 2.5 | 2.5 | 2.5 |
| | Degree of resin loss from prepreg surface (visual observation) | none | none | none | none | none | none | none |

TABLE 6

Test results of resin compositions of Comparative Examples

| Property | Test item (method) | unit | C1 | C2 | C3 | C4 | C5 | C6 | C7 | C8 |
|---|---|---|---|---|---|---|---|---|---|---|
| Glass transition temperature | Tg(DSC) | ° C. | 164 | 155 | 152 | 155 | 156 | 154 | 156 | 158 |

TABLE 6-continued

Test results of resin compositions of Comparative Examples

| Property | Test item (method) | | | | | | | | |
|---|---|---|---|---|---|---|---|---|---|
| Thermal resistance (T288) | TMA/288° C. | minute | >60 | 45 | 55 | 20 | 48 | 52 | 30 | 45 |
| Ambient temperature P/S (25° C.) | tensile strength tester | lb/in | 7.0 | 5.0 | 5.5 | 6.0 | 5.5 | 5.8 | 6.2 | 8.0 |
| High temperature P/S (350° C.) | tensile strength tester | lb/in | 5.0 | 3.0 | 3.3 | 3.0 | 3.2 | 3.3 | 3.1 | 5.1 |
| Yield rate in solder pad fall-off test | / | % | 70 | 60 | 65 | 50 | 60 | 62 | 55 | 80 |
| PIA bonding strength | tensile strength tester | lb/in | 3.0 | 3.0 | 3.0 | 2.0 | 3.0 | 3.0 | 3.0 | 6.6 |
| PIB bonding strength | tensile strength tester | lb/in | 3.0 | 1.5 | 1.5 | 1.0 | 1.0 | 1.5 | 1.5 | >8.0 |
| PIA/PIB soldering resistance | 288° C., 10 seconds | cycles | >20 | 15 | 17 | 10 | 14 | 17 | 15 | >20 |
| Dust weight loss | / | % | 2.00 | 0.20 | 0.20 | 0.30 | 1.20 | 1.15 | 1.30 | 0.50 |
| Prepreg stickiness | peel-off time (30° C./72 h/10 g) | second | 0 | 12 | 10 | 13 | 8 | 8 | 8 | 20 |
| | Degree of resin loss from prepreg surface (visual observation) | / | none | moderate | moderate | moderate | moderate | moderate | moderate | serious |

| Property | Test item (method) | | C9 | C10 | C11 | C12 | C13 | C14 | C15 | C16 |
|---|---|---|---|---|---|---|---|---|---|---|
| | Glass transition temperature | Tg(DSC) | 150 | 140 | 152 | 162 | 140 | 158 | 155 | 155 |
| | Thermal resistance (T288) | TMA/288° C. | 50 | 30 | 50 | 30 | 40 | 5 | 40 | 35 |
| | Ambient temperature P/S (25° C.) | tensile strength tester | 7.0 | 6.5 | 6.8 | 7.0 | 6.0 | 5.0 | 5.0 | 5.2 |
| | High temperature P/S (350° C.) | tensile strength tester | 4.6 | 4.5 | 4.6 | 4.7 | 4.0 | 3.3 | 3.5 | 3.5 |
| | Yield rate in solder pad fall-off test | / | 70 | 60 | 75 | 60 | 70 | 30 | 75 | 70 |
| | PIA bonding strength | tensile strength tester | 6.0 | 5.8 | 6.0 | 5.5 | 4.0 | 3.0 | 5.0 | 4.0 |
| | PIB bonding strength | tensile strength tester | >8.0 | >8.0 | >8.0 | 7.0 | 2.0 | 3.0 | 4.0 | 2.0 |
| | PIA/PIB soldering resistance | 288° C., 10 seconds | >20 | >20 | >20 | 10 | 8 | 10 | 10 | 10 |
| | Dust weight loss | / | 0.20 | 0.40 | 0.40 | 0.50 | 0.40 | 0.25 | 0.25 | 0.30 |
| | Prepreg stickiness | peel-off time (30° C./72 h/10 g) | 20 | 21 | 25 | 23 | 25 | 3 | 2.5 | 2.5 |
| | Degree of resin loss from prepreg surface (visual observation) | / | serious | serious | serious | serious | serious | none | none | none |

Based on the test results from Table 4 to Table 6, it is apparent that by using the solution according to the present disclosure (E1 to E23), at least one laminate property is superior to other solutions. More surprisingly, it is found that the resin composition disclosed herein has one, more or all of the following properties: high yield rate in solder pad fall-off test at high temperature, low dust weight loss, low stickiness, high thermal resistance, high peel strength to copper foil, high bonding strength to polyimide layer, etc.

Comparing Example E10 and Comparative Examples C1 to C3 or comparing Example E2 and Comparative Examples C5 to C7, it can be found that the addition of carboxyl-containing butadiene acrylonitrile resin increases the yield rate in solder pad fall-off test at high temperature, enhances the peel strength between laminate and copper foil and bonding strength between laminate and polyimide layer, and at the same time achieves low dust weight loss and low stickiness of the prepreg.

Comparing Example E20 and Comparative Examples C8 to C13, it can be found that the addition of phosphazene significantly lowers the prepreg stickiness and, compared with other flame retardants, lowers the dust weight loss; in addition, the addition of phosphazene also achieves high yield rate in solder pad fall-off test at high temperature and high thermal resistance of the laminate.

Comparing Example E20 and Comparative Example C14 to C16, it can be found that the addition of acrylic triblock copolymer, in contrast with other acrylic resins, increases the thermal resistance of the laminate, and achieves high soldering resistance of rigid-flex board (PIA/PIB), high peel strength between laminate and copper foil and bonding strength between laminate and polyimide layer, high P/S at ambient temperature and high temperature, high yield rate in solder pad fall-off test at high temperature, high PIA and PIB bonding strength and low dust weight loss of prepreg.

The above detailed description is merely illustrative in nature and is not intended to limit the embodiments of the subject matter or the application and uses of such embodiments. As used herein, the term "exemplary" means "serving as an example, instance, or illustration." Any implementation described herein as exemplary is not necessarily to be construed as preferred or advantageous over other implementations.

Moreover, while at least one exemplary example or comparative example has been presented in the foregoing detailed description, it should be appreciated that a vast number of variations exist. It should also be appreciated that the exemplary one or more embodiments described herein are not intended to limit the scope, applicability, or configuration of the claimed subject matter in any way. Rather, the foregoing detailed description will provide those skilled in the art with a convenient guide for implementing the described one or more embodiments. Also, the scope defined by the claims includes known equivalents and foreseeable equivalents at the time of filing this patent application.

What is claimed is:

1. A resin composition, comprising:
   (A) 100 parts by weight of epoxy resin;
   (B) 2 to 50 parts by weight of carboxyl-containing butadiene acrylonitrile resin;
   (C) 1 to 40 parts by weight of phosphazene; and
   (D) 1 to 8 parts by weight of acrylic triblock copolymer.

2. The resin composition of claim 1, comprising:
   (A) 100 parts by weight of epoxy resin;
   (B) 2 to 40 parts by weight of carboxyl-containing butadiene acrylonitrile resin;
   (C) 5 to 40 parts by weight of phosphazene; and
   (D) 1 to 5 parts by weight of acrylic triblock copolymer.

3. The resin composition of claim 1, wherein the (A) epoxy resin comprises an epoxy resin having a structure as shown below:

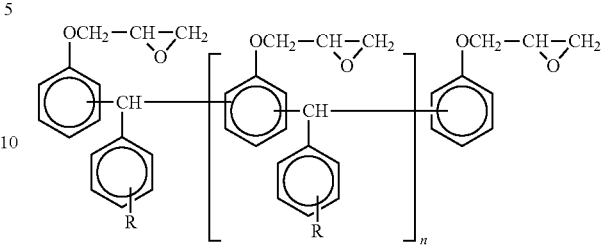

wherein R represents hydrogen, an alkyl group or an epoxy ether group, and n is an integer of 1 to 10.

4. The resin composition of claim 1, wherein the (B) carboxyl-containing butadiene acrylonitrile resin comprises carboxyl-terminated butadiene acrylonitrile rubber, prepolymerized carboxyl-terminated butadiene acrylonitrile rubber or a combination thereof.

5. The resin composition of claim 1, wherein the (C) phosphazene comprises a phosphazene compound having a structure as shown below:

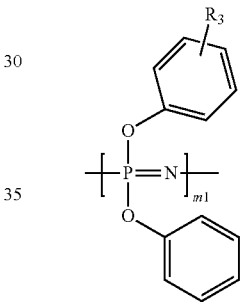

wherein $R_3$ represents hydrogen, a hydroxyl group, a double bond-containing hydrocarbyl group, a double bond-containing aryl group, an alkoxy group or an alkenyloxy group, and m1 represents a number average degree of polymerization and is a number of 1 to 6.

6. The resin composition of claim 1, wherein the (D) acrylic triblock copolymer comprises unsaturated polyester or polybutadiene as a midblock and comprises poly(methyl methacrylate) or polystyrene as a terminal block.

7. The resin composition of claim 1, further comprising the following curing agent: maleimide resin, benzoxazine resin, polyphenylene oxide resin, cyanate ester resin, isocyanate resin, polyolefin resin, anhydride, polyester, polyvinyl butyral, phenolic curing agent, amine curing agent, polyamide, polyimide or a combination thereof.

8. The resin composition of claim 1, further comprising the following additive: curing accelerator, flame retardant, inorganic filler, solvent, toughening agent, silane coupling agent or a combination thereof.

9. An article made from the resin composition of claim 1, comprising a prepreg, a laminate, a printed circuit board or a rigid-flex board.

10. The article of claim 9, which has a yield rate of greater than or equal to 80% in a solder pad fall-off test at 350° C.

11. The article of claim 9, which has at least one of the following properties:

a time to delamination as measured by reference to IPC-TM-650 2.4.24.1 of greater than or equal to 50 minutes;

a peel strength at 350° C. as measured by reference to IPC-TM-650 2.4.8 of greater than or equal to 4.6 lb/in;

a bonding strength of a PIA board as measured by reference to IPC-TM-650 2.4.8 of greater than or equal to 4.0 lb/in;

a bonding strength of a PIB board as measured by reference to IPC-TM-650 2.4.8 of greater than or equal to 4.0 lb/in; and a solder dip test of a PIA board or a PIB board as measured by reference to IPC-TM-650 2.4.23 of greater than 20 cycles.

* * * * *